(12) United States Patent
Kitora et al.

(10) Patent No.: US 9,953,784 B2
(45) Date of Patent: Apr. 24, 2018

(54) INFORMATION PROCESSING APPARATUS CAPABLE OF CONTROLLING MECHANICAL SWITCH OF POWER SUPPLY AND CONTROL METHOD

(71) Applicant: CANON KABUSHIKI KAISHA, Tokyo (JP)

(72) Inventors: Masakazu Kitora, Kashiwa (JP); Akitomo Fukui, Yokohama (JP); Takehiro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 14/845,257

(22) Filed: Sep. 3, 2015

(65) Prior Publication Data

US 2016/0071674 A1    Mar. 10, 2016

(30) Foreign Application Priority Data

Sep. 10, 2014 (JP) ................. 2014-184278

(51) Int. Cl.
*H01H 3/26* (2006.01)
*H01H 47/00* (2006.01)
*G03G 15/00* (2006.01)
*G06F 1/32* (2006.01)

(52) U.S. Cl.
CPC ......... *H01H 47/00* (2013.01); *G03G 15/5004* (2013.01); *G03G 15/5075* (2013.01); *G03G 15/80* (2013.01); *G06F 1/3209* (2013.01); *G06F 1/3287* (2013.01); *Y02B 60/1282* (2013.01)

(58) Field of Classification Search
CPC .......... G03G 15/5004; G03G 15/5075; G03G 15/80; H01H 47/00; G06F 1/3209; G06F 1/3287
USPC ................................................ 307/140, 141.4
See application file for complete search history.

(56) References Cited

U.S. PATENT DOCUMENTS

| 5,151,910 | A | 9/1992 | Inuyama et al. |
| 7,594,056 | B2 | 9/2009 | Fujise et al. |
| 7,982,889 | B2 | 7/2011 | Okada |
| 2011/0316453 | A1* | 12/2011 | Ewing ................ H05B 37/0272 315/362 |

FOREIGN PATENT DOCUMENTS

JP    2007-208822 A    8/2007

* cited by examiner

*Primary Examiner* — Thomas Skibinski
(74) *Attorney, Agent, or Firm* — Fitzpatrick, Cella, Harper & Scinto

(57) ABSTRACT

An information processing apparatus capable of communicating with an external apparatus includes: a network controller configured to communicate with the external apparatus; a mechanical switch configured to switch on or off according to a switch driving signal; a control unit configured to output the switch driving signal to the mechanical switch according to a signal from the network controller; and a power supplying unit configured to supply power to the network controller and the control unit in a case where the mechanical switch is off. In a case where the mechanical switch is off and the network controller receives an instruction to turn on power from the external apparatus, the control unit outputs the switch driving signal to turn on the mechanical switch.

11 Claims, 12 Drawing Sheets

| | POWER STATE 401 | POWER STATE 402 | POWER STATE 403 | POWER STATE 404 | POWER STATE 405 |
| --- | --- | --- | --- | --- | --- |
| | PLUG IS DISCONNECTED | OFF MODE (REMOTE-ON STANDBY) | POWER SAVING MODE 1 | POWER SAVING MODE 2 | STANDBY/ACTUAL OPERATION MODE |
| FIRST POWER SUPPLY UNIT | off | on | on | on | on |
| SECOND POWER SUPPLY UNIT | off | off | on | on | on |
| THIRD POWER SUPPLY UNIT FOR CONTROLLER UNIT | off | off | off | on | on |
| THIRD POWER SUPPLY UNIT FOR IMAGE READING UNIT | off | off | off | on | on |
| THIRD POWER SUPPLY UNIT FOR OPERATION UNIT | off | off | off | on | on |
| THIRD POWER SUPPLY UNIT FOR PRINTER UNIT | off | off | off | off | on |
| SWITCH STATE OF REMOTE SWITCH | off | off | on | on | on |

FIG.4

INFORMATION PROCESSING APPARATUS CAPABLE OF CONTROLLING MECHANICAL SWITCH OF POWER SUPPLY AND CONTROL METHOD

BACKGROUND OF THE INVENTION

Field of the Invention

The present invention relates to an information processing apparatus capable of controlling a mechanical switch of a power supply via communication with an external apparatus and a control method of the information processing apparatus.

Description of the Related Art

In recent years, a technique of remotely controlling a power supply has been established. For example, in the computer industry, there has been established a technique in which a computer remotely controls a power supply of a terminal to be managed. Further, in the consumer electronics industry, there is a technique in which a user uses a tablet terminal outside to remotely control a power supply of a home appliance such as an air conditioner or an air cleaner. Further, in an image forming apparatus or the like, there is a technique of remotely turning on the image forming apparatus according to a packet obtained from a server apparatus (see Japanese Patent Laid-Open No. 2007-208822).

In most cases, a power supply switch of the image forming apparatus includes a main power supply switch for turning on/off the whole apparatus and a power saving key for shifting a power state to a power saving mode. Further, some image forming apparatuses include a subsidiary power supply switch for shifting to the state of a high-speed startup mode in which the apparatuses can be started at a high speed while an off-state is maintained. As a main switch such as the main power supply switch or the subsidiary power supply switch, there is used a mechanical switch such as a rocker switch which has a movable portion for enabling an operator to visually determine the on/off state of the switch and whose outer appearance changes.

There is not a method for remotely turning on the main switch of the image forming apparatus which is constituted by the mechanical switch. Japanese Patent Laid-Open No. 2007-208822 discloses a technique of remotely controlling the turning on/off of some of power supply switches in an image forming apparatus, but a main switch is turned on or off manually.

SUMMARY OF THE INVENTION

In a first aspect of the present invention, there is provided an information processing apparatus capable of communicating with an external apparatus, the information processing apparatus comprising: a network controller configured to communicate with the external apparatus; a mechanical switch configured to switch on or off according to a switch driving signal; a control unit configured to output the switch driving signal to the mechanical switch according to a signal from the network controller; and a power supplying unit configured to supply power to the network controller and the control unit in a case where the mechanical switch is off, wherein in a case where the mechanical switch is off and the network controller receives an instruction to turn on power from the external apparatus, the control unit outputs the switch driving signal to turn on the mechanical switch.

Further features of the present invention will become apparent from the following description of exemplary embodiments (with reference to the attached drawings).

BRIEF DESCRIPTION OF THE DRAWINGS

FIG. 4 is a chart showing the power states of the image forming apparatus 10 according to the embodiment;

DESCRIPTION OF THE EMBODIMENTS

Figure 1:
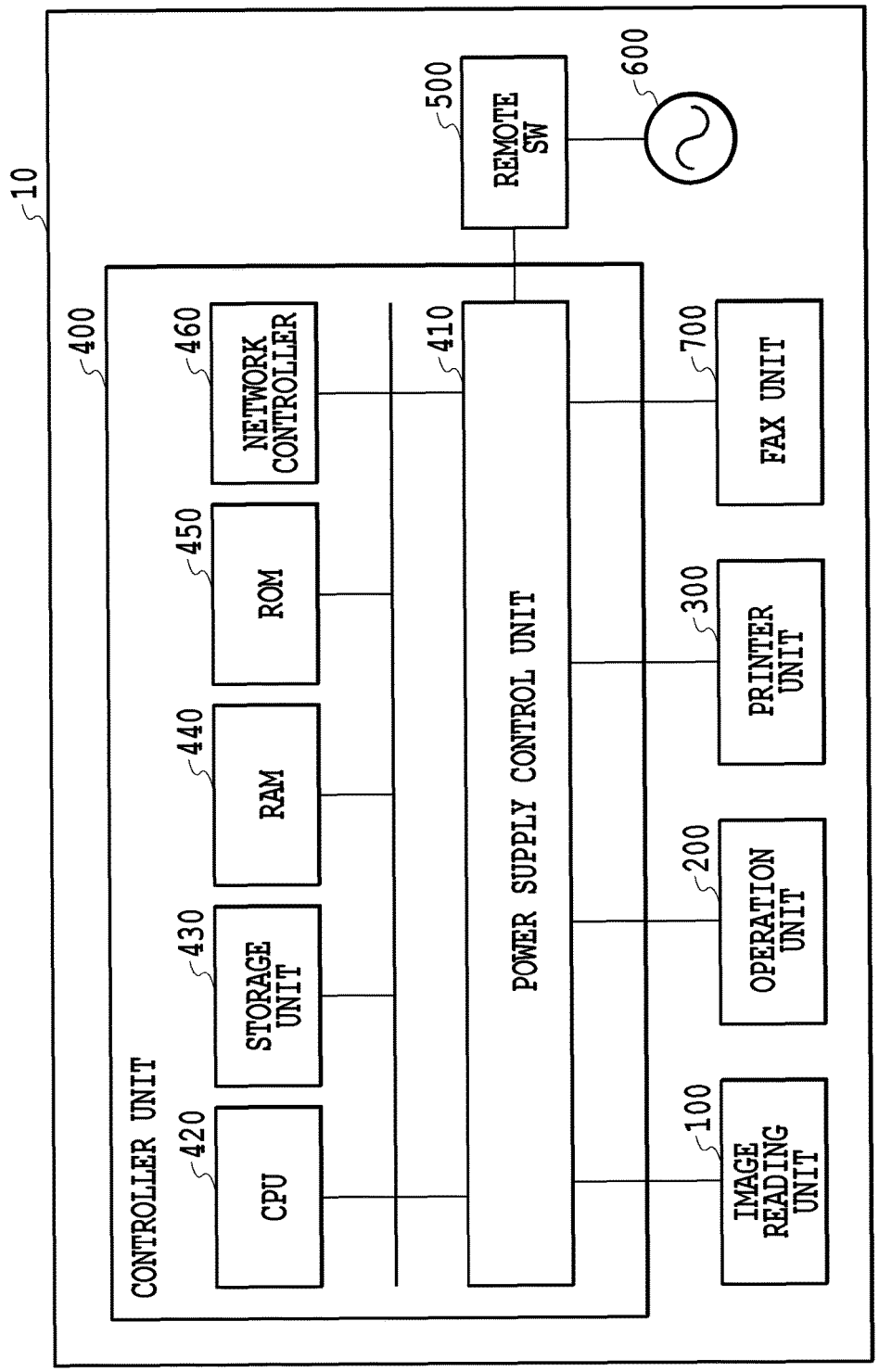
FIG. 1 is a simplified view of an image forming apparatus 10 including a remote switch according to an embodiment.

Modes for carrying out the present invention will be described below with reference to the drawings. Incidentally, features shown in the following embodiments are mere examples, and the present invention is not limited to the features shown in the drawings.

[Embodiment 1]

FIG. 1 is a simplified view of an image forming apparatus 10 including a remote switch 500. The image forming apparatus 10 includes an image reading unit 100, an operation unit 200, a printer unit 300, a controller unit 400, a remote switch (SW) 500, and an AC plug 600. The controller unit 400 includes a power supply control unit 410, a CPU 420, a storage unit 430, a RAM 440, a ROM 450, and a network controller 460.

The image reading unit 100 scans and digitizes a document and sends data to the controller unit. The operation unit 200 enables a user to perform color/monochrome setting, paper setting, or the like for scanning the document by using the image reading unit 100. The printer unit 300 prints data read by the image reading unit 100, data stored in the storage unit 430, or data received by the network controller 460. A fax unit 700 sends an image read by the image reading unit 100 as fax data through a public line, and transfers, as print data, fax data received through the public line to the controller unit 400.

The CPU 420 reads boot data from the ROM 450 at the time of startup, and loads the boot data into the RAM 440. The CPU 420 expands and reads data in the storage unit 430 according to the boot data, thereby performing startup, and sends an image to be displayed at a user interface to the operation unit 200. Further, a LAN cable, for example, is connected to the network controller (physical layer controller) 460, and receives print data from a computer via a network.

The remote switch 500 is a mechanical switch. The mechanical switch is used because the image forming apparatus has a unit to be controlled in a mechatronic manner such as an engine unit. An image processing unit (not shown) for performing image processing has high functions, and is not different from IT (information technology) devices in terms of functions. On the other hand, the image forming apparatus still has a mechatronic unit as well. Users desire both that remote control be realized as in IT devices and that a sure mechanical switch operation of turning off the switch be performed. Accordingly, such a mechanical switch is used. Incidentally, as a method for remotely controlling an operation of turning off a power supply switch using a mechanical switch, there is already publicly known a rocker switch in which a solenoid coil is built in the rocker switch, and a contact is opened or closed by energizing the solenoid coil.

Figure 2:
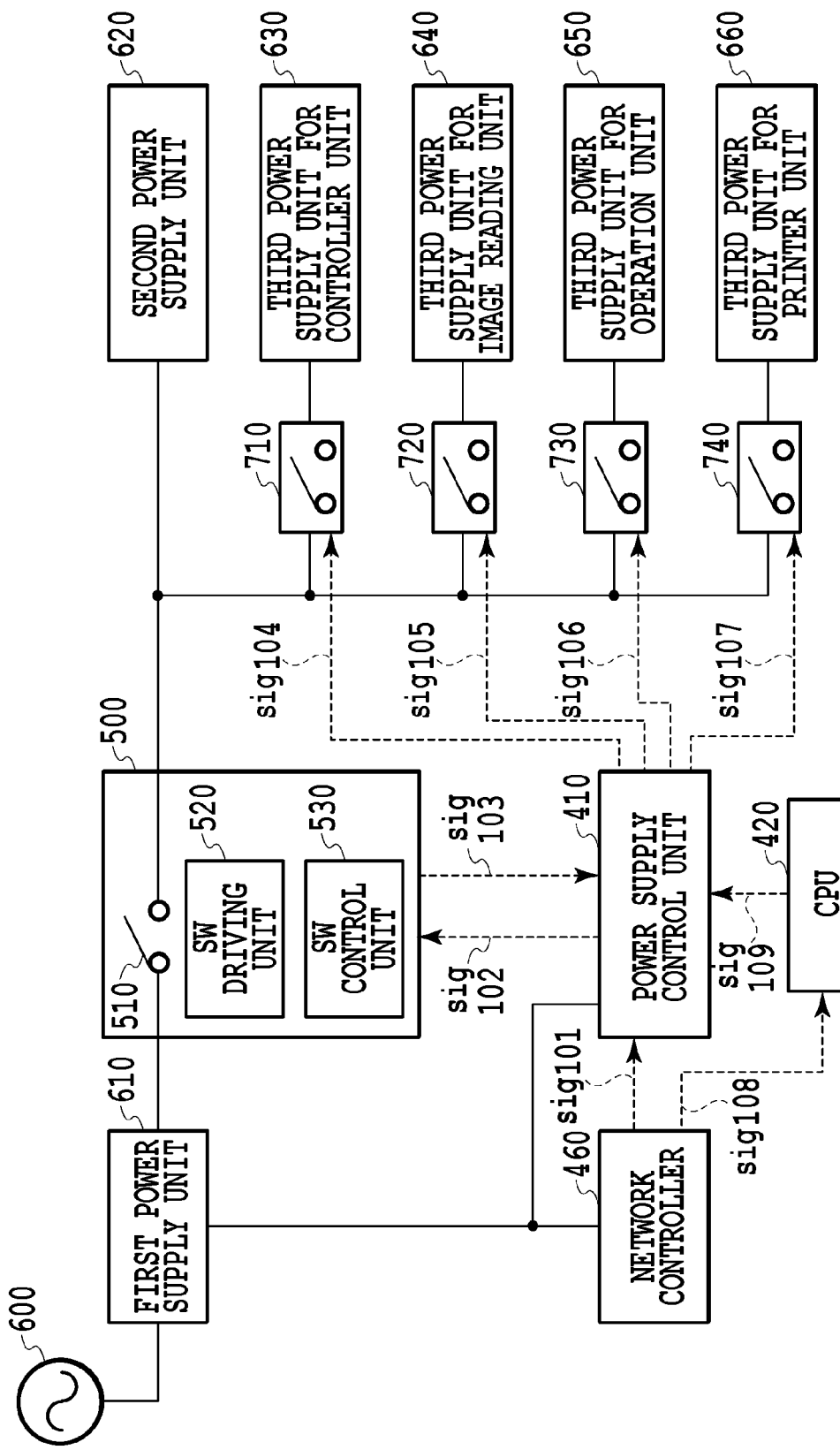
FIG. 2 is a power supply configuration diagram of the image forming apparatus 10 including the remote switch according to the embodiment.

FIG. 2 is a power supply configuration diagram of the image forming apparatus 10 including the remote switch. A solid line shows a power supply line, and a dotted line shows a control line. In a case where the AC plug 600 is connected to a power outlet, power is supplied to a first power supply unit 610. The first power supply unit 610 is a power supply unit for supplying power to the network controller 460, the remote switch 500, and the power supply control unit 410.

The network controller 460 outputs a remote power-on signal sig101 to the power supply control unit 410. Further, the network controller 460 outputs a packet signal sig108 to the CPU 420. The CPU 420 receives an instruction to turn off power from a remote via the network controller 460, and outputs a remote power-off signal sig109 to the power supply control unit 410 in order to drive the remote switch 500 to an off state.

The power supply control unit 410 outputs a switch driving signal sig102 to the remote switch 500. Further, the power supply control unit 410 inputs a switch state signal sig103 from the remote switch 500. Further, the power supply control unit 410 inputs the remote power-on signal sig101 from the network controller 460, and inputs the remote power-off signal sig109 from the CPU 420. Furthermore, the power supply control unit 410 outputs power supply controlling signals sig104 to sig107 to switches 710 to 740, respectively.

The remote switch 500 includes a switch 510, a switch driving unit 520, and a switch control unit 530. The switch driving unit 520 includes a motor. In a case where the switch driving signal sig102 is asserted, the switch control unit 530 drives the motor of the switch driving unit 520 and inverts the state of the switch 510. The switch control unit 530 sets the switch state signal sig103 to be high or low according to the state of the switch 510. For example, in a case where the switch 510 is on, the switch state signal sig103 is set to be high, and in a case where the switch 510 is off, the switch state signal sig103 is set to be low. The switch control unit 530 outputs the switch state signal sig103 to the power supply control unit 410.

In a case where the remote switch 500 is on, a second power supply unit 620 is energized. The second power supply unit 620 supplies power to part of the CPU 420 of the controller unit and part of the fax unit 700.

A third power supply unit for controller unit 630 supplies power to part of the storage unit 430 and the CPU 420 of the controller unit and part of the fax unit 700. A third power supply unit for image reading unit 640 supplies power to the image reading unit 100. A third power supply unit for operation unit 650 supplies power to the operation unit 200. A third power supply unit for printer unit 660 supplies power to the printer unit 300. The third power supply units 630, 640, 650, and 660 are connected to the switches 710, 720, 730, and 740, respectively. The switches 710, 720, 730, and 740 receive input of the power supply controlling signals sig104, sig105, sig106, and sig107 from the power supply control unit 410, respectively, and can turn on or off power supplies according to these signals. The switches 710 to 740 may be relay switches or FET switches because the switches 710 to 740 only need to be able to cut off electrical connection.

Figures 3A, 3B:
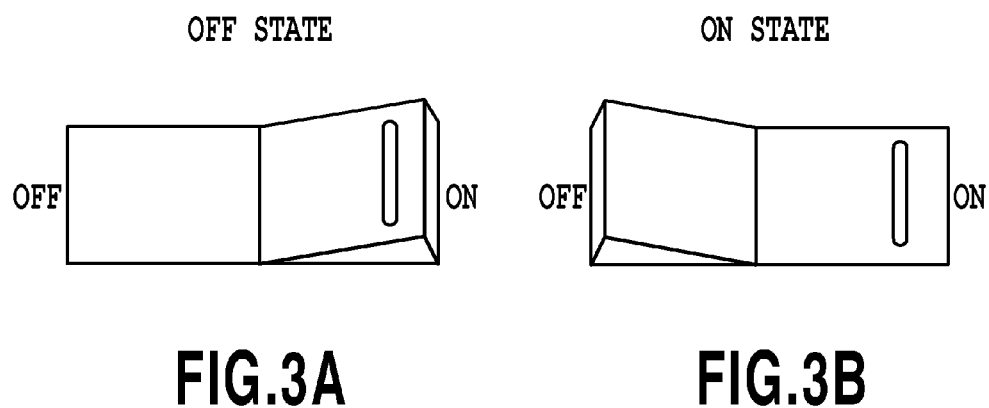
FIGS. 3A and 3B are schematic views of the mechanical remote switch according to the embodiment.

FIGS. 3A and 3B are schematic views of the mechanical remote switch 500. FIG. 3A shows a state in which the switch is off. FIG. 3B shows a state in which the switch is on. Since the remote switch 500 is a mechanical switch, as shown in FIGS. 3A and 3B, it is possible to visually recognize, from the state of the switch, whether the power supply is off (FIG. 3A) or on (FIG. 3B). This remote switch 500 is configured so that in a case where the switch control unit 530 receives the switch driving signal sig102, the switch driving unit 520 drives the switch 510. For example, in a case where the switch control unit 530 receives the switch driving signal sig102 in a state in which the power supply is off as shown in FIG. 3A, the switch driving unit 520 drives the switch 510 so that the power supply is on as shown in FIG. 3B. On the other hand, in a case where the switch control unit 530 receives the switch driving signal sig102 in a state in which the power supply is on as shown in FIG. 3B, the switch driving unit 520 drives the switch 510 so that the power supply is off as shown in FIG. 3A.

Next, the power state of the image forming apparatus 10 of the present embodiment will be described with reference to FIG. 4.

A power state 401 is a plug-out state in which the function of the image forming apparatus is completely stopped with the AC plug 600 being out. The switch 510 of the remote switch 500 is off.

A power state 402 is an off-mode (remote-on standby) state in which the AC plug 600 is connected to the power outlet and only the first power supply unit is energized. Even in this power state, the function of the image forming apparatus 10 is stopped, but power is supplied to the network controller 460 and a power supply command from a remote can be received. The switch 510 of the remote switch 500 is off.

A power state 403 is a state in which the switch 510 is flipped on as a result of a manual operation or a command instruction given by a remote operation after the power state 402. In the power state 403, the second power supply unit 620 is energized. This power state 403 is referred to as the power saving mode 1. In this power state, a fax can be received, and an instruction to output print data to the image forming apparatus 10 can be received from a PC on the network.

A power state 404 is a state in which the third power supply unit for image reading unit 640 and the third power supply unit for operation unit 650 are energized after the power state 403. This power state 404 is referred to as the power saving mode 2. In this power state, power is supplied to a sensor of the image reading unit and a UI, and an operator can perform a preliminary operation (placement of a document and personal identification) for performing an operation by using the image forming apparatus 10.

A power state 405 is a power state in which power is supplied to all the power supply units of the image forming apparatus 10 and all functions are enabled. The power state 405 is referred to as a standby or actual operation mode.

Figure 5:
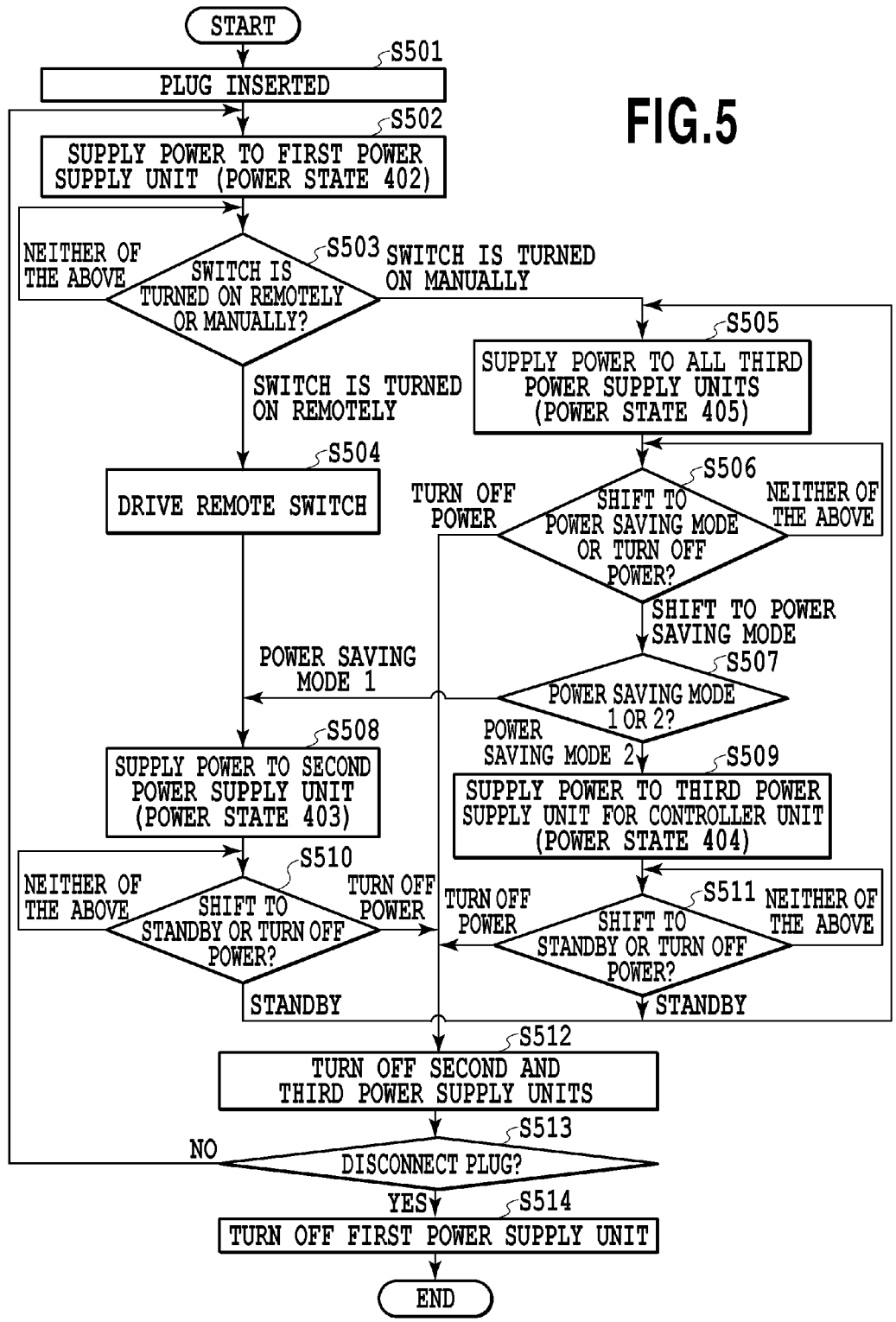
FIG. 5 is a flowchart of Embodiment 1.

Next, a flow of power control processing in the present embodiment will be described with reference to a flowchart. FIG. 5 is a flowchart showing an example of a power supply control flow according to the present embodiment. Incidentally, in an initial state, the AC plug 600 is removed from the power outlet.

Step S501 is a step in which a user inserts the AC plug into the power outlet to make the image forming apparatus 10 usable.

In a case where the AC plug is inserted in step S501, the process proceeds to step S502, and AC power is supplied to the first power supply unit 610. This step S502 corresponds to the power state 402 (the remote-on standby mode) shown in FIG. 4. In other words, in step S502, power is supplied to the network controller 460, the remote switch 500, and the power supply control unit 410.

In step S503, the power supply control unit 410 determines how the remote switch is turned on. The power supply control unit 410 switches subsequent processing according to the result of the determination. For example, in a case where in step S503, the power supply control unit 410 detects that the switch state signal sig103 changes from low to high, it is determined that the user manually turns on the remote switch 500. Then the process proceeds to step S505. On the other hand, in a case where the remote power-on signal sig101 is asserted, the power supply control unit 410 determines that the remote switch 500 is turned on remotely. Then the process proceeds to step S504. Incidentally, in a case where neither of the signals is input, the power supply control unit 410 performs step S503 again to perform the determination processing for the next steps.

Explanation will be made on a reason why in step S503, the subsequent processing (the type of power supply unit to which power is to be supplied) is switched according to whether the user turns on the remote switch manually or remotely. The case where the remote switch is turned on remotely is a case where the power supply is turned on by performing a remote operation. In this case, occasionally, no one is present near the image forming apparatus 10. In other words, there is a high possibility that processing will not be performed immediately by using the image forming apparatus 10. Accordingly, in a case where the remote switch is turned on remotely, minimum power is supplied. This saves power. On the other hand, in a case where the user turns on the remote switch manually, there is a high possibility that certain processing will be then performed by using the image forming apparatus 10. Accordingly, in the case where the user turns on the remote switch manually, various types of initialization processing, which are generally performed, are also performed, and power is supplied to the various power supply units. Explanation will be given below specifically with reference to the flowchart.

The case where in step S503, it is determined that the power supply control unit 410 is turned on remotely is a case where the remote power-on signal sig101 is asserted. The remote power-on signal sig101 is asserted in a case where the network controller 460 receives a special packet such as a magic packet from an external apparatus. In other words, the remote power-on signal sig101 is asserted in a case where the network controller 460 receives an instruction to turn on power from the external apparatus. For example, in a case where the network controller 460 receives the special packet from the external apparatus, the remote power-on signal sig101 output to the power supply control unit 410 is set to be high. In a case where it is detected that the remote power-on signal sig101 is set to be high, the power supply control unit 410 turns on the switch 510 of the remote switch 500 in order to remotely start the power supply. More specifically, in a case where in step S504, the power supply control unit 410 detects that the remote power-on signal sig101 is asserted, the power supply control unit 410 asserts the switch driving signal sig102, inverts the state of the switch, and turns on the switch. In this manner, the main switch can be turned on by performing remote control using the network controller 460, the power supply control unit 410, and the remote switch 500 including the switch driving unit 520 and the switch control unit 530, which are energized by the first power supply control unit.

In a case where the user manually turns on the remote switch, the process proceeds to step S505. In step S505, in order to perform common initialization processing, the power supply control unit 410 sets the power supply controlling signals sig104 to sig107 to be high, turns on the switches 710 to 740, and supplies power to all the third power supply units. This step S505 corresponds to the power state 405 (the standby/operation mode) in FIG. 4.

In a case where the image forming apparatus 10 turns into the power state 405, in subsequent step S506, the power supply control unit 410 determines whether to shift to a power saving mode in order to perform power saving control. In step S506, the power control unit 410 determines whether to shift to the power saving mode, whether to turn off the power supply, or whether to do neither of the above. In step S506, in a case where it is detected that the switch state signal sig103 is changed from high to low or that the CPU 420 asserts the remote power-off signal sig109, the power supply control unit 410 determines that the power supply is to be off, and the process proceeds to step S512. In a case where in step S506, it is detected that the user has not given an operation instruction for a predetermined time, it is determined that the shift to the power saving mode is to be made, and the process proceeds to step S507. In a case where a certain image forming operation is being performed in response to the user's instruction, or the above predetermined time has not passed yet, the process remains in step S506, and the determination is made again.

In step S507, the power supply control unit 410 determines the power saving mode to which the standby state which is the power state 405 is to be shifted. The user may determine the power saving mode in consideration of usability and energy saving. Otherwise, the power saving mode may be automatically determined based on the presence or absence of an optional function. In a case where the user sets the power saving mode, for example, the power supply control unit 410 refers to user setting information stored in the storage unit 430 in the controller unit 400. Further, in a case where the user sets a mode in which energy saving is considered important, a shift to the power saving mode 1 is determined, and the process proceeds to step S508. On the other hand, in a case where the user selects a mode in which usability is considered important, the saving energy mode 2 is determined, and the process proceeds to step S509.

In step S508, the power supply control unit 410 performs power supply setting in the power saving mode 1. Step S508 is performed after the remote switch is driven in step S504 or it is determined in step S507 that a shift to the power saving mode 1 is to be made. Step S508 is a step in which power saving is considered important, and power is supplied only to the least necessary parts. In a case where the power supply controlling signals sig104 to sig107 are high, the power supply controlling signals sig104 to sig107 are set to be low, and the third power supply units are turned off. Accordingly, the second power supply unit is energized, but all the third power supply units are turned off. A state after this step S508 is performed corresponds to the power state 403 (the power saving mode 1) in FIG. 4.

In step S509, the power supply control unit 410 performs power supply setting in the power saving mode 2. Since usability is considered important in the power saving mode 2, the power supply controlling signal sig107 is set to be low, and the third power supply unit for printer unit is turned off. This step S509 corresponds to the power state 404 (the power saving mode 2) in FIG. 4. Incidentally, in order to enhance a power saving effect while maintaining usability, in step S509, the power supply controlling signal sig104 of the controller unit 400 out of the power supply controlling signals may be kept to be high, and the remaining power supply controlling signals sig105 to sig107 may be set to be low. In this case, since the third power supply unit for controller unit is on, it is possible to access data in the storage unit 430 from the network and to speed up a return sequence for returning to the standby state. Incidentally, although not shown in the flowchart, the following processing may be performed after the shift to the power state 404 (the power saving mode 2) shown in FIG. 4 is made in step S509, for example. More specifically, in a case where a predetermined condition is satisfied (in a case where a predetermined time has passed, for example), the power supply controlling signals sig105 to sig107 excluding the power supply controlling signal sig104 of the controller unit may be set to be low as stated above.

After shifting to the power saving mode, the image forming apparatus 10 determines whether to return to the standby state in order to perform return control. In step S510, the power supply control unit 410 determines whether to return to the standby state from the power saving mode 1. In a case where in step S510, the power supply control unit 410 detects that the switch state signal sig103 is changed from high to low, the process proceeds to step S512 for turning off power. Further, also in a case where in step S510, the power supply control unit 410 detects that the CPU 420 asserts the remote power-off signal sig109, the process proceeds to step S512. In a case where in step S510, the operation unit 200 gives an instruction to return to the standby state or that an instruction to form an image is given via the network, the power supply control unit 410 proceeds to step S505, and power is supplied to all the power supply units. Further, in step S511, the power supply control unit 410 determines whether to return to the standby state from the power saving mode 2. Processing in step S511 is similar to processing in step S510.

In step S512, the power supply control unit 410 turns off power. First, the power supply control unit 410 sets all the power supply controlling signals sig104 to sig107 to be low, and turns off each of the third power supply units. Next, the power supply control unit 410 confirms the switch state signal sig103. In a case where the switch state signal sig103 indicates an on state, it is determined that a remote power-off command is issued to turn off power, and the switch driving signal sig102 is asserted to invert and turn off the switch 510, thereby turning off the second power supply unit.

In step S513, a next step is selected according to whether the user disconnects the plug. In a case where the user does not disconnect the plug and leaves the plug as it is or in a case where the remote power-off command is issued to turn off power, the plug is still inserted, and the process proceeds to step S502. Incidentally, at this time, power is already supplied to the first power supply unit, and the process substantially proceeds to step S503. On the other hand, in a case where the plug is disconnected, the process proceeds to step S514. In step S514, energization of the first power supply unit is stopped, and the operation of the image forming apparatus 10 ends.

As described above, according to the present embodiment, the mechanical switch can be turned on remotely. Involvement of the operation of the switch enables the user to visually identify the on/off state easily at the time of remotely controlling power-on/off. Further, a power supply unit to be turned on may vary according to whether the user turns on the mechanical main switch manually or remotely.

[Embodiment 2]

In Embodiment 1, in a case where power is supplied to the first supply unit 610, a remote operation is always accepted. However, the user may set the configuration so as to avoid an unnecessary remote operation. In Embodiment 2, explanation will be made on an example of setting whether or not to accept a remote operation. The main features of the image forming apparatus of Embodiment 2 are identical to those of Embodiment 1 shown in FIG. 1.

Figure 6:
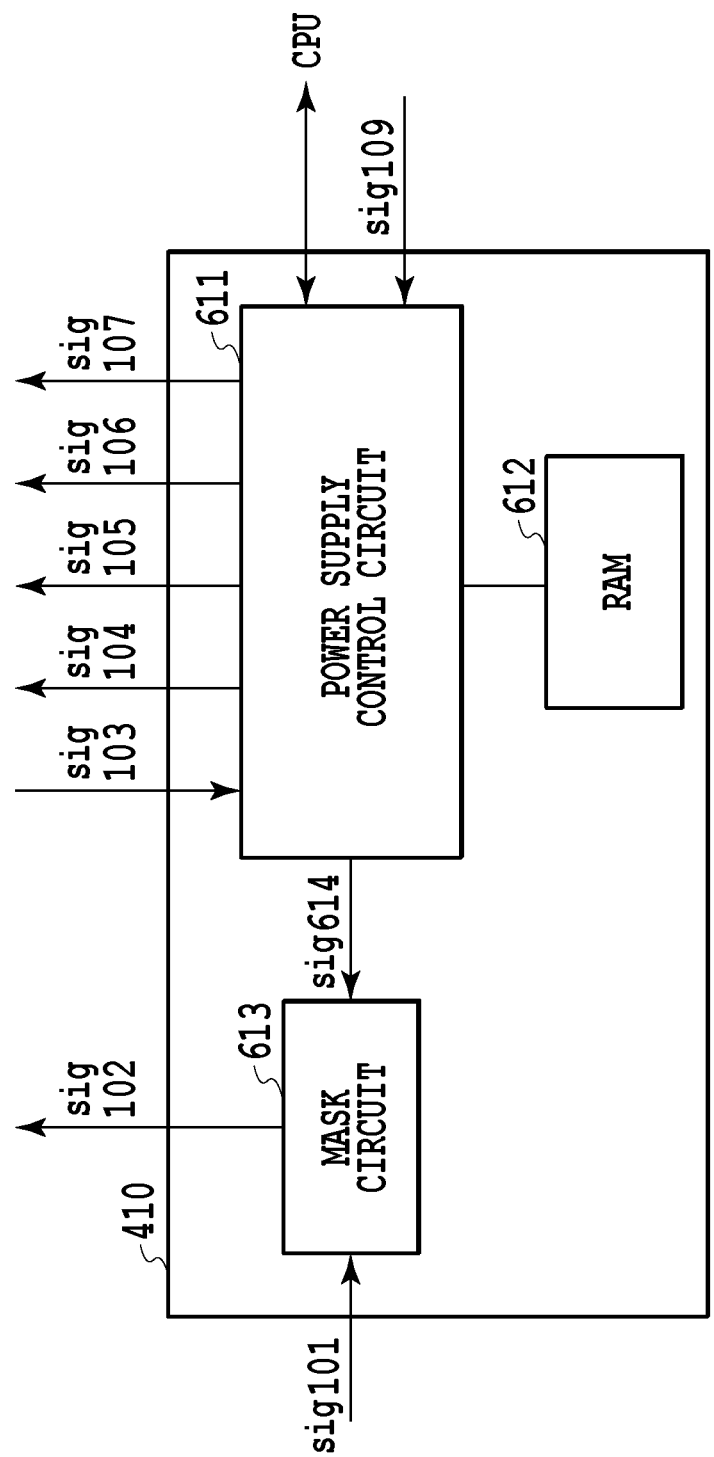
FIG. 6 is an internal block diagram of a power supply control unit 410 according to Embodiment 2.

FIG. 6 is an internal block diagram of the power supply control unit 410 according to Embodiment 2. A power supply control circuit 611 generates and outputs the power supply controlling signals sig104 to sig107. Further, the power supply control circuit 611 inputs the remote power-off signal sig109 from the CPU 420, and can exchange other signals with the CPU. The power supply control circuit 611 sets the power supply controlling signals sig104 to sig107 to be high or low according to the input signal.

Further, a RAM 612 and a mask circuit 613 are connected to the power supply control circuit 611. Remote-on permit information is stored in the RAM 612, which is a storage unit. The remote-on permit information indicates whether to permit a remote operation. Based on the remote-on permit information, the power supply control circuit 611 generates a mask signal sig614 and outputs the mask signal sig614 to the mask circuit 613.

The mask circuit 613 determines whether or not to assert the switch driving signal sig102 based on the remote power-on signal sig101 and the mask signal sig614.

Figure 7:
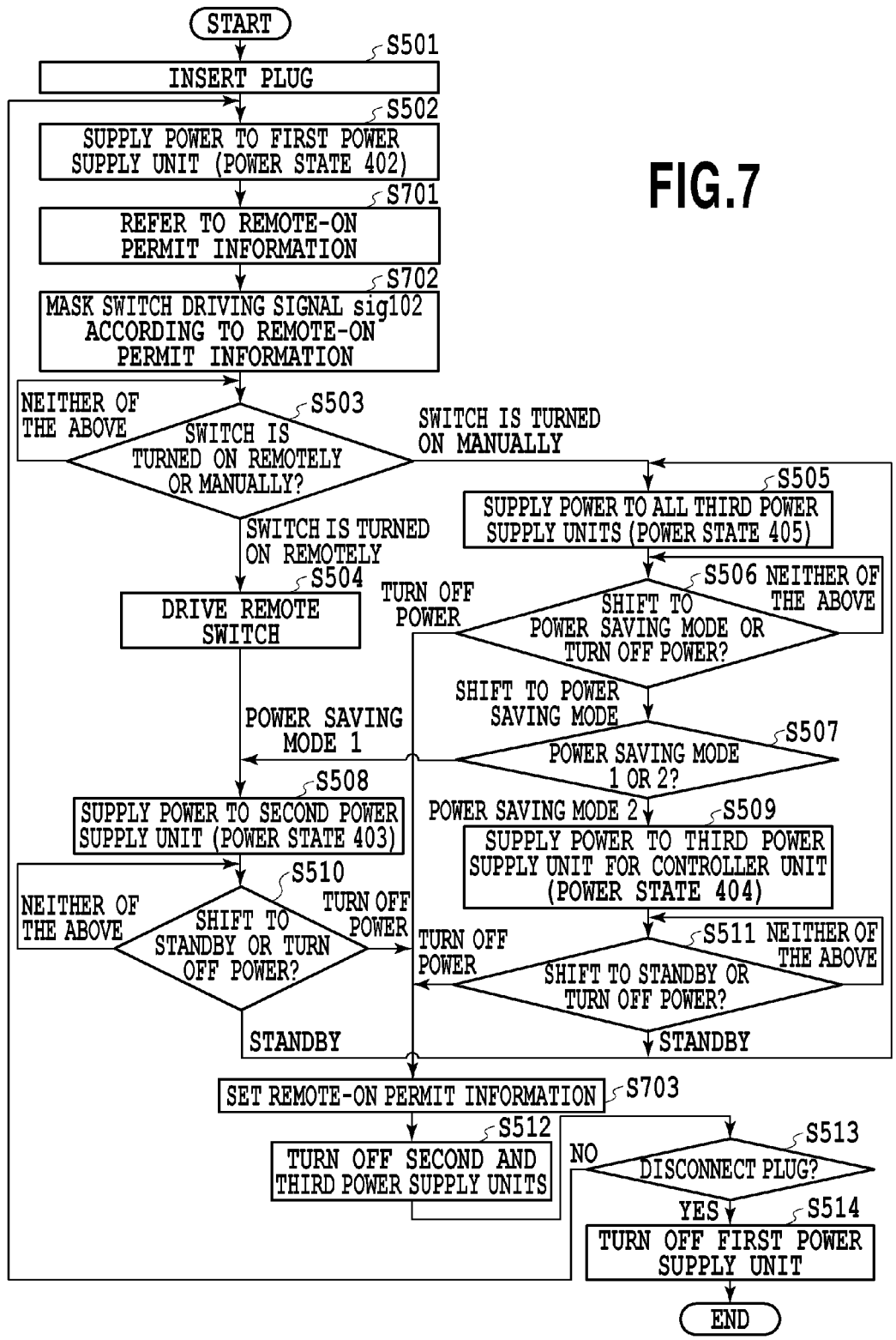
FIG. 7 is a flowchart of Embodiment 2.

FIG. 7 is a flowchart showing an example of a power supply control flow according to Embodiment 2. Incidentally, the same step as that of FIG. 5 will be denoted by the same reference numeral as that of FIG. 5 and its explanation will be omitted.

After power is supplied to the first power supply unit in step S502, in step S701, the power supply control unit 410 refers to the remote-on permit information indicating whether or not to permit the remote power-on signal sig101 to turn on power. More specifically, the power supply control circuit 611 in the power supply control unit 410 refers to the remote-on permit information stored in the RAM 610. Incidentally, initial setting in a ROM (not shown) is written to the RAM 610 at the time of supplying power to the first power supply unit. In the present embodiment, the initial remote-on permit information is high at the time of factory shipping. In step S703, which will be described later, the permit information after initialization is set based on setting provided by the user.

In step S702, the power supply control circuit 611 determines whether to output the mask signal sig614 based on the remote-on permit information which is referred to in step S701. In a case where the remote-on permit information is high, the output mask signal sig614 is high, and the switch driving signal sig102 is asserted based on the state of the remote power-on signal sig101. On the other hand, in a case where the remote-on permit information is low, the switch driving signal sig102 is not asserted irrespective of the remote power-on signal sig101.

In step S703, the power supply control circuit 611 updates the remote-on permit information before turning off power.

The remote-on permit information may be updated in response to direct reception of the user's instruction from the operation unit 200 or may be updated based on setting information from a printer driver and application software.

As stated above, whether to enable or disable a remote-on operation is determined based on the remote-on permit information set by the user, whereby it is possible to avoid an unnecessary remote-on operation.

[Embodiment 3]

In Embodiment 1, in a case where power is supplied to the first power supply unit 610, a remote operation is always accepted. In order to avoid an unnecessary remote operation, another switch may be provided so as to turn on or off the first power supply unit 610. The main features of the image forming apparatus of Embodiment 3 are identical to those of Embodiment 1 shown in FIG. 1.

Figure 8:
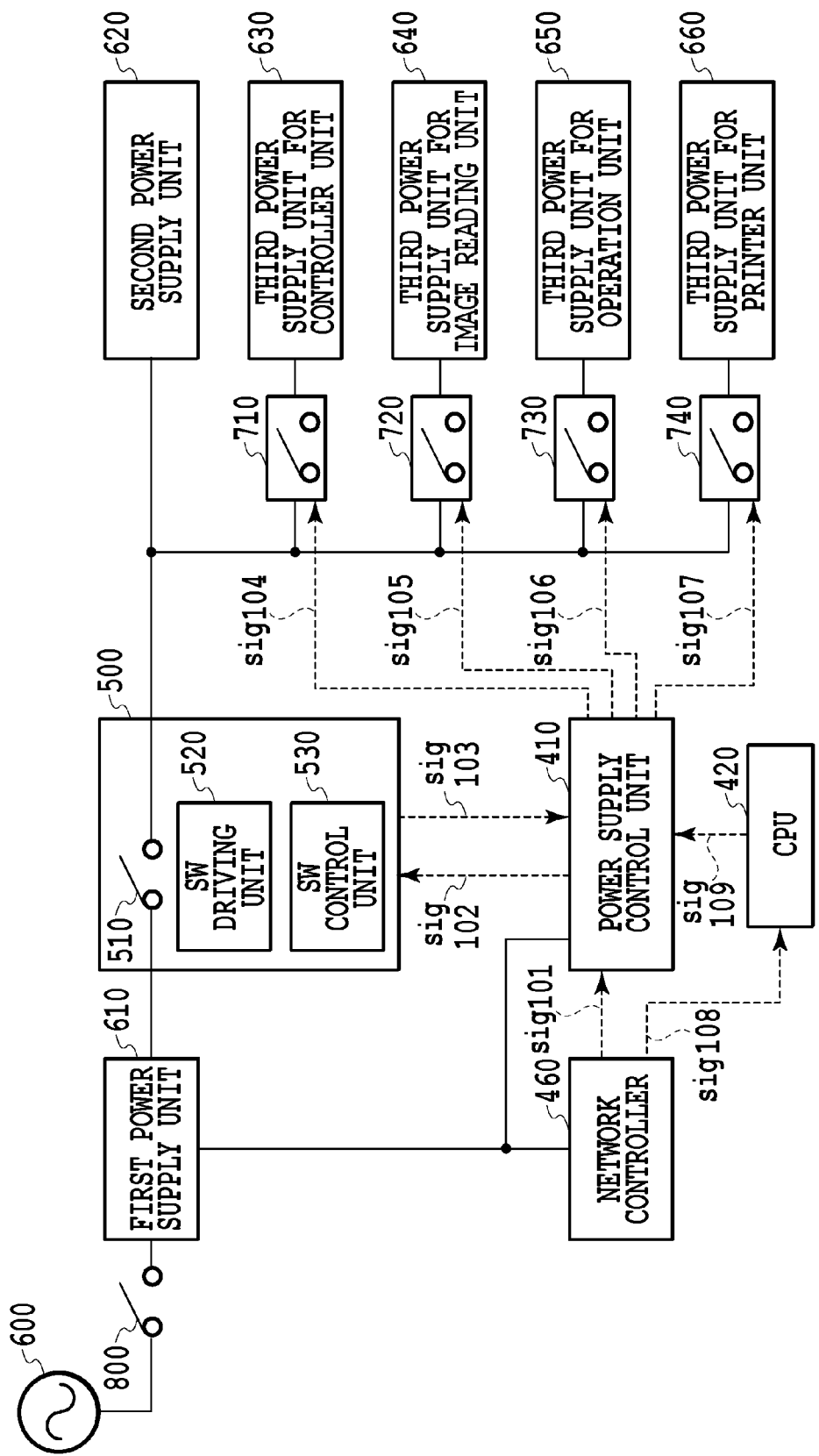
FIG. 8 is a power supply configuration diagram of Embodiment 3.

FIG. 8 is a power supply configuration diagram of the image forming apparatus 10 including the remote switch. FIG. 8 is identical to FIG. 2, which is the power supply configuration diagram, except that a switch 800 is provided between the AC plug 600 and the first power supply unit 610. In order to supply power to the first power supply unit 610, the AC plug 600 is inserted into the power outlet to turn on the switch 800 and start power supply. The switch 800 is provided at a position where the switch is invisible to the user (for example, at a back side of a main body), only a manager or a serviceperson can operate the switch 800, and the user uses the remote switch 500 as the main switch. In a case where the manager or the serviceperson wants to avoid power-on caused by an unnecessary remote operation, the switch 800 may be off. In the present embodiment, another switch is provided in addition to the switch which can be operated remotely, and the states of the switches are combined so that power on/off control can be set, whereby it is possible to enhance the usability of remote control.

[Embodiment 4]

In the above embodiments, explanation will be made on a case where the user turns on the remote switch 500 manually and a case where the user turns on the remote switch 500 remotely. In the case where the user turns on the remote switch 500 manually, an external apparatus for remotely controlling the image forming apparatus 10 determines that the image forming apparatus is off until the startup of the image forming apparatus 10 is completed. Accordingly, there is a case where timing at which the user turns on the remote switch 500 manually is not the same as timing at which the external apparatus determines that the image forming apparatus is turned on. Accordingly, there is a possibility that although the user turns on the remote switch manually, the external apparatus issues a command to turn on power remotely while the image forming apparatus 10 is being turned on. In this case, there is a possibility that the power supply control unit 410 asserts the switch driving signal sig102; as a result, the remote switch which is turned on manually is turned off while the image forming apparatus is being started, and power is turned off. Accordingly, in the present embodiment, explanation will be made on an example in which such a problem does not arise.

Figure 9:
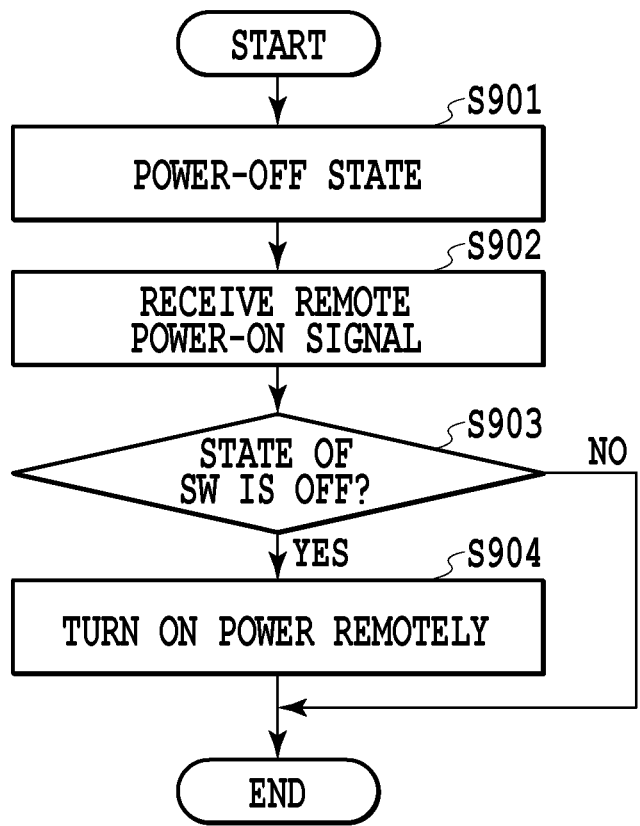
FIG. 9 is a flowchart of Embodiment 4.

FIG. 9 is a flowchart of Embodiment 4. In step 901, the image forming apparatus 10 is in an off state. A state in which the image forming apparatus 10 is off is a state in which the AC plug 600 is connected to the outlet, and the remote switch 500 is in the state shown in FIG. 3A. More specifically, the state in which the image forming apparatus 10 is in an off state is the power state 402 (the remote-on standby mode) in FIG. 4. In a case where the image forming apparatus 10 is in an off state, power is supplied from the first power supply unit 610 to the power supply control unit 410, the network controller 460, and the remote switch 500.

In step S902, the power supply control unit 410 receives the remote power-on signal sig101 from the network controller 460. More specifically, the power supply control unit 410 receives a startup packet from the external apparatus via the network controller 460 at the time of turning off the image forming apparatus 10.

In a case where a startup packet is received in step S902, in step S903, the power supply control unit 410 determines whether the switch 510 of the remote switch 500 is on or off based on the switch state signal sig103. In a case where the switch state signal sig103 indicates an off state, the power supply control unit 410 proceeds to step S904. Further, in a case where the switch state signal sig103 indicates an on state, the power supply control unit 410 ends the process.

In step S904, the power supply control unit 410 sends the switch driving signal sig102 to the switch control unit 530. The switch control unit 530 receives the switch driving signal sig102 and drives the switch driving unit 520. The switch driving unit 520 drives the switch 510 into a power-on state. The power supply control unit 410 can confirm whether the remote switch 500 is on based on the switch state signal sig103.

In a case where the external apparatus issues an instruction to turn on power remotely, the power supply control unit 410 determines the state of the remote switch 500, and in a case where the remote switch 500 is off, the power supply control unit 410 outputs the switch driving signal sig102 to the remote switch 500. This processing can prevent the switch from malfunctioning in a case where the user turns on the remote switch 500 manually, and a startup packet is received from the external apparatus while the image forming apparatus 10 is being started.

Figure 10A:
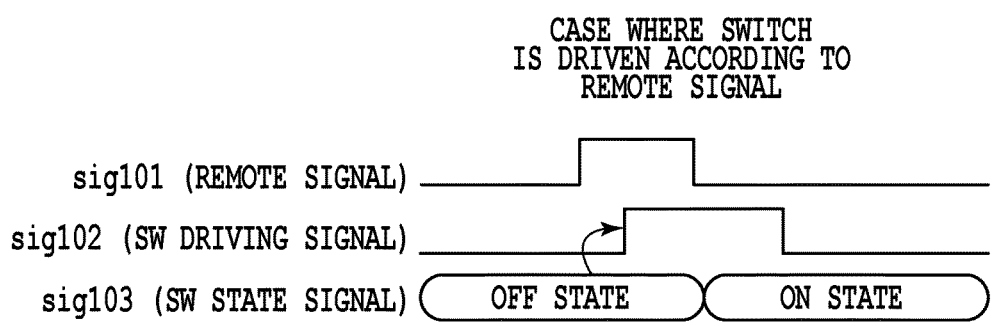
FIGS. 10A and 10B are timing charts of a hard signal according to Embodiment 4.
Figure 10B:
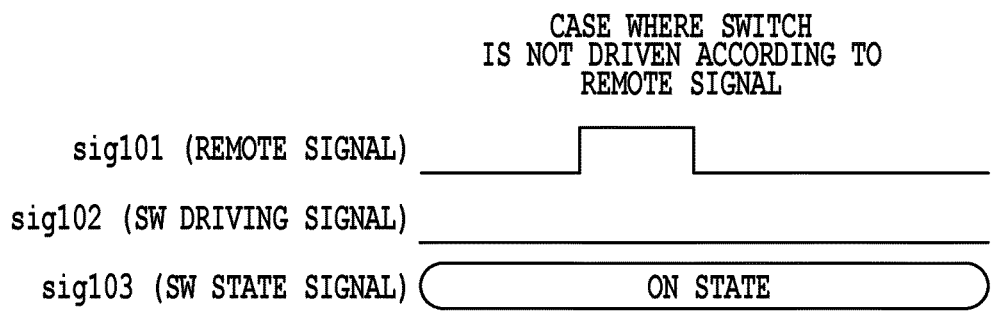

FIGS. 10A and 10B are timing charts of a hard signal according to Embodiment 4. FIG. 10A is a timing chart of a hard signal in a case where the remote switch 500 is driven according to the remote power-on signal sig101 (that is, a case where the result of the determination in step S903 is yes). FIG. 5B is a timing chart of a hard signal in a case where the remote switch 500 is not driven according to the remote power-on signal sig101 (that is, a case where the result of the determination in step S903 is no).

FIG. 10A shows a case where the switch state signal sig103 indicates an off state. In a case where the remote switch 500 is off and the remote power-on signal sig101 is asserted, the power supply control unit 410 sends the switch driving signal sig102 to the switch control unit 530. The switch control unit 530 turns on the switch driving unit 520 in a case where the switch driving signal sig102 received from the power supply control unit 410 is asserted. In a case where the switch driving unit 520 is turned on, the switch state signal sig103 is set to indicate an on state, and the power supply control unit 410 can confirm the state.

FIG. 10B shows a case where the switch state signal sig103 indicates an on state. First, the power supply control unit 410 receives the remote power-on signal sig101 from the network controller 460. Thereafter, the power supply control unit 410 confirms the switch state signal sig103 from the switch control unit 530. In a case where the power supply control unit 410 confirms the switch state signal sig103 and confirms that the remote switch 500 is on, the switch driving signal sig102 is not asserted.

[Embodiment 5]

In Embodiment 4, explanation has been made on an example in which in a case where an instruction to turn on power remotely is received, processing is performed with reference to the state of the remote switch 500. In Embodiment 5, explanation will be made on an example in which in a case where an instruction to turn off power remotely is received, processing is performed with reference to the state of the remote switch 500.

Figure 11:
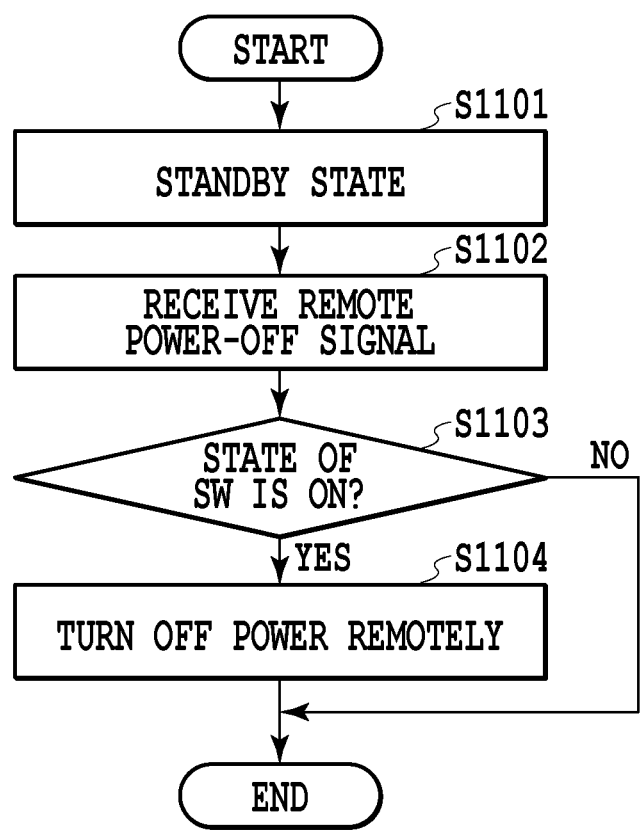
FIG. 11 is a flowchart of Embodiment 5.

FIG. 11 is a flowchart of Embodiment 5. In step S1101, the image forming apparatus 10 is in a standby state. In a case where the image forming apparatus 10 is in a standby state, the remote switch 500 is in a state shown in FIG. 3B, and the switches 710, 720, 730, and 740 are on.

In step S1102, the power supply control unit 410 receives the remote power-off signal sig109 from the CPU 420. More specifically, the power supply control unit 410 receives a shutdown packet from the external apparatus via the network controller 460 and the CPU 420.

In step S1103, the power supply control unit 410 determines whether the switch of the remote switch 500 is on or off based on the switch state signal sig103. In a case where the switch state signal sig103 is on, the power supply control unit 410 proceeds to step S1104. On the other hand, in a case where the switch state signal sig103 indicates an off state, the process ends.

In step S1104, the power supply control unit 410 sends the switch driving signal sig102 to the switch control unit 530. The switch control unit 530 receives the switch driving signal sig102, and drives the switch driving unit 520. The switch driving unit 520 drives the switch 510 into a power-off state. The power supply control unit 410 can confirm whether the remote switch 500 is off based on the switch state signal sig103.

The present embodiment can prevent the switch from malfunctioning in a case where the user turns off the remote switch 500 manually, and the shutdown packet is received from a power supply managing apparatus while the image forming apparatus 10 is being shut down.

Figure 12A:
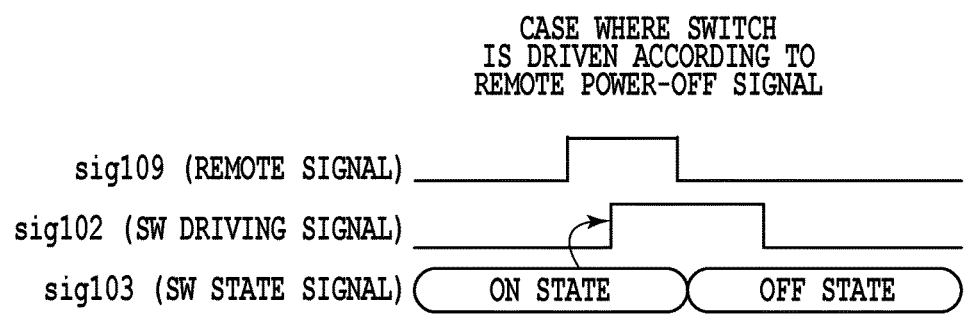
FIGS. 12A and 12B are timing charts of a hard signal according to Embodiment 5.
Figure 12B:
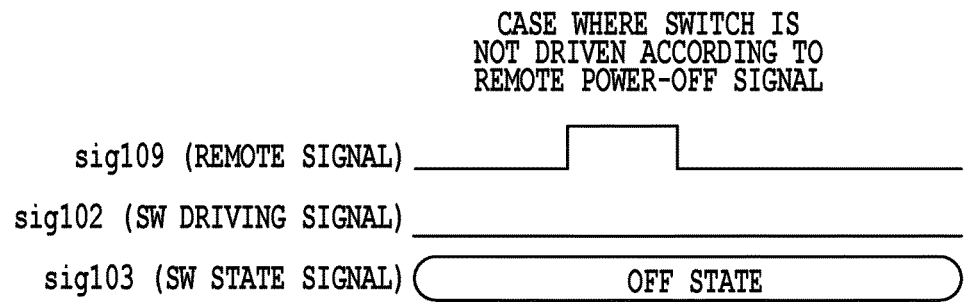

FIGS. 12A and 12B are timing charts of a hard signal according to the present embodiment. FIG. 12A is a timing chart of a hard signal in a case where the remote switch 500 is driven according to the remote power-off signal sig109 (that is, a case where the result of the determination in step S1103 is yes). FIG. 12B is a timing chart of a hard signal in a case where the remote switch 500 is not driven according to the remote power-off signal sig109 (that is, a case where the result of the determination in step S1103 is no).

FIG. 12A shows that the switch state signal sig103 is on. In a case where the remote switch 500 is on and the remote power-off signal sig109 is asserted, the power supply control unit 410 sends the switch driving signal sig102 to the switch control unit 530. In a case where the switch driving signal sig102 received from the power supply control unit 410 is asserted, the switch control unit 530 turns off the switch driving unit 520. In a case where the remote switch 500 is turned off, the switch state signal sig103 is set to indicate an off state, and the power supply control unit 410 can confirm this.

FIG. 12B shows that the switch state signal sig103 indicates an off state. The power supply control unit 410 receives a remote shutdown signal from the external apparatus via the network controller 460 and the CPU 420. Thereafter, the power supply control unit 410 confirms the switch state signal sig103 from the switch control unit 530. In a case where the power supply control unit 410 confirms the switch state signal sig103, and confirms that the remote switch 500 is off, the switch driving signal sig102 is not asserted.

Incidentally, in Embodiment 5, explanation will be made on an example in which in step S1101, the image forming apparatus 10 is in a standby state. However, similar processing may be performed in the power state 403 (the power saving mode 1) or the power state 404 (the power saving mode 2) explained with reference to FIG. 4.

[Other Embodiments]

In the above embodiments, explanation has been made on the examples in which the remote switch is provided in the image forming apparatus. However, a target apparatus is not limited to an image forming apparatus. More specifically, the target apparatus only needs to be an information processing apparatus which can communicate with an external apparatus, and which includes a plurality of power supply units and a mechanical switch as a main switch, wherein the power supply units are turned on stepwise and is not limited to the image forming apparatus of the above embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-184278, filed Sep. 10, 2014, which is hereby incorporated by reference herein in its entirety.

What is claimed is:

1. An information processing apparatus capable of communicating with an external apparatus, the information processing apparatus comprising:
a network controller configured to communicate with the external apparatus;
a mechanical switch configured to be (i) switched on according to a switch driving signal, (ii) switched on or off according to a user operation, and (iii) to output a state signal indicating whether the mechanical switch is on or off;
a control unit configured to output the switch driving signal to the mechanical switch according to a predetermined signal from the network controller and to receive the state signal; and a power supplying unit configured to supply power to the network controller and the control unit, wherein in a case where the network controller receives a predetermined instruction from the external apparatus when the mechanical switch is off, the network controller outputs the predetermined signal to the control unit and then the control unit outputs the switch driving signal to the mechanical switch.

2. The information processing apparatus according to claim 1, wherein in a case where the mechanical switch is on and the switch driving signal is input, the mechanical switch is turned off, and wherein in a case where the mechanical switch is off, and the switch driving signal is input, the mechanical switch is turned on.

3. The information processing apparatus according to claim 1, further comprising:

a CPU, wherein in a case where the network controller receives a signal to shut down the information processing apparatus from the external apparatus, the network controller outputs a power-off signal to the control unit via the CPU, and wherein in a case where the control unit receives the power-off signal, the control unit outputs the switch driving signal.

4. The information processing apparatus according to claim 1, wherein in a case where the control unit receives a signal from the network controller, the control unit determines whether or not to output the switch driving signal with reference to the state signal.

5. The information processing apparatus according to claim 1, wherein in a case the control unit receives a remote power-on signal from the network controller, and the state signal indicates that the mechanical switch is off, the control unit outputs the switch driving signal.

6. The information processing apparatus according to claim 1, wherein in a case the control unit receives a remote power-on signal from the network controller, and the state signal indicates that the mechanical switch is on, the control unit does not output the switch driving signal.

7. The information processing apparatus according to claim 1, wherein in a case where the control unit receives a power-off signal from the network controller, and the state signal indicates that the mechanical switch is on, the control unit outputs the switch driving signal.

8. The information processing apparatus according to claim 1, wherein in a case where the control unit receives a power-off signal from the network controller, and the state signal indicates that the mechanical switch is off, the control unit does not output the switch driving signal.

9. The information processing apparatus according to claim 1, further comprising:

a storage unit for storing setting information indicating whether to switch the mechanical switch according to control by the external apparatus, wherein in a case where the setting information indicates that the mechanical switch is not to be switched, the control unit does not output the switch driving signal.

10. A method for controlling an information processing apparatus capable of communicating with an external apparatus, the information processing apparatus comprises:

a network controller configured to communicate with the external apparatus;

a mechanical switch configured to be (i) switched on according to a switch driving signal, (ii) switched on or off according to a user operation, and (iii) to output a state signal indicating whether the mechanical switch is on or off;

a control unit configured to output the switch driving signal to the mechanical switch according to a predetermined signal from the network controller and to receive the state signal; and a power supplying unit configured to supply power to the network controller and the control unit, the method comprising:

outputting, by the network controller, the predetermined signal to the control unit and then outputting, by the control unit, the switch driving signal to the mechanical switch in a case where the network controller receives a predetermined instruction from the external apparatus when the mechanical switch is off.

11. A non-transitory computer readable storage medium storing a program which causes a computer to perform a method for controlling an information processing apparatus capable of communicating with an external apparatus, the information processing apparatus comprises:

a network controller configured to communicate with the external apparatus;

a mechanical switch configured to be (i) switched on according to a switch driving signal, (ii) switched on or off according to a user operation, and (iii) to output a state signal indicating whether the mechanical switch is on or off;

a control unit configured to output the switch driving signal to the mechanical switch according to a predetermined signal from the network controller and to receive the state signal; and a power supplying unit configured to supply power to the network controller and the control unit, the method comprising:

outputting, by the network controller, the predetermined signal to the control unit and then outputting, by the control unit, the switch driving signal to the mechanical switch in a case where the network controller receives a predetermined instruction from the external apparatus when the mechanical switch is off.

* * * * *